(12) United States Patent
Margolin et al.

(10) Patent No.: US 11,715,117 B2
(45) Date of Patent: Aug. 1, 2023

(54) ASSESSING TECHNOLOGIES USING IMAGE-BASED LEARNING ALGORITHMS

(71) Applicant: PayPal, Inc., San Jose, CA (US)

(72) Inventors: Itay Margolin, Pardesiya (IL); Liran Dreval, Tel Aviv (IL)

(73) Assignee: PayPal, Inc., San Jose, CA (US)

( * ) Notice: Subject to any disclaimer, the term of this patent is extended or adjusted under 35 U.S.C. 154(b) by 648 days.

(21) Appl. No.: 16/711,306

(22) Filed: Dec. 11, 2019

(65) Prior Publication Data
US 2021/0182878 A1    Jun. 17, 2021

(51) Int. Cl.
| | |
|---|---|
| G06Q 30/02 | (2023.01) |
| G06Q 30/0201 | (2023.01) |
| G06F 17/18 | (2006.01) |
| G06N 20/00 | (2019.01) |

(52) U.S. Cl.
CPC ......... G06Q 30/0201 (2013.01); G06F 17/18 (2013.01); G06N 20/00 (2019.01)

(58) Field of Classification Search
CPC combination set(s) only.
See application file for complete search history.

(56) References Cited

U.S. PATENT DOCUMENTS

| | | | | |
|---|---|---|---|---|
| 10,373,093 | B2 * | 8/2019 | Aki | G06Q 10/06393 |
| 10,810,261 | B2 * | 10/2020 | Hart | G06Q 40/12 |
| 2019/0122074 | A1 * | 4/2019 | Zhang | G06K 9/6267 |
| 2020/0104645 | A1 * | 4/2020 | Ionescu | G06V 10/454 |
| 2020/0211019 | A1 * | 7/2020 | Allbright | G06N 20/10 |
| 2021/0264528 | A1 * | 8/2021 | Sliz | G06Q 30/0201 |

OTHER PUBLICATIONS

Xiang Zhang et al., "Character-level Convolutional Networks for Text Classification," Proceedings of the 28th International Conference on Neural Information Processing Systems—vol. 1, Dec. 7-12, 2015, pp. 649-657.

(Continued)

*Primary Examiner* — Arif Ullah
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to assessing technology activity using image-based machine learning algorithms. A computer system may access a data set that includes a plurality of parameters (e.g., technologies) for an item (e.g., a web-based interface). The plurality of parameters may correspond to a plurality of time intervals. The computer system may generate a two-dimensional graphical representation of the data set. A first dimension of the graphical representation may be indicative of values of the plurality of parameters at different time intervals and a second dimension of the graphical representation may be indicative of a time period that includes the plurality of time intervals. At least one characteristic of the data set may be determined by inputting the graphical representation of the data set to a trained machine learning module. The trained machine learning module may implement an image-based learning algorithm.

18 Claims, 10 Drawing Sheets

(56) References Cited

OTHER PUBLICATIONS

Louis de Vitry, "Encoding Time Series as Images—Gramian Angular Field Imaging," Analytics Vidhya—Medium; https://medium.com/analytics-vidhya/encoding-time-series-as-images-b043becbdbf3, 14 pages [Retrieved Dec. 10, 2019].
How to Create a Gantt Chart, Creating Gantt Charts; https://www.gnatt.com/creating-gnatt-charts.htm; 11 pages. [Retrieved Oct. 1, 2019].
How to encode a time series as an image to feed it into CNN?, Data Science Stack Exchange; https://datascience.stackechange.com/questions/49563/how-to-encode-a-time-series-as-an-image-to-feed-it-to-cnn; 2 pages. [Retrieved Oct. 1, 2019].
What is a 1D Convolution Layer in Deep Learning?, Data Science Stack Exchange; https://datasciencestackexchange.com/questions/17241/what-is-a-1d-convolution-layer-in-deep-learning; 2 pages. [Retrieved Oct. 1, 2019].
Introduction to character level CNN in text classification with PyTorch Implementation; https://www.youtube.com/watch?v=CNY8VjJt-iQ; YouTube Video, 3 pages.

\* cited by examiner

| Tag | 0 | 25 | 50 | 75 | 100 | 125 | 150 | 175 | 200 | 225 | 250 | 275 | 300 | 325 | 350 |
|---|---|---|---|---|---|---|---|---|---|---|---|---|---|---|---|
| A |   |   |   |   | 1 |   |   |   |   |   |   |   |   |   | 1 |
| B |   |   | 1 | 1 |   |   | 1 | 1 | 1 | 1 | 1 | 1 |   |   |   |
| C |   |   |   |   |   |   |   |   | 1 | 1 | 1 | 1 | 1 |   |   |

FIG. 4

| Tag | 0 | 25 | 50 | 75 | 100 | 125 | 150 | 175 | 200 | 225 | 250 | 275 | 300 | 325 | 350 |
|---|---|---|---|---|---|---|---|---|---|---|---|---|---|---|---|
| A |   |   |   |   | 1 |   |   |   |   |   |   |   |   |   | 1 |
| B |   |   | 1 | 1 |   |   | 1 | 1 | 1 | 1 | 1 | 1 |   |   |   |
| C |   |   |   |   |   |   |   |   | 1 | 1 | 1 | 1 | 1 |   |   |
| D |   |   |   |   |   |   |   |   |   |   |   |   |   |   |   |

FIG. 5

| Name | 0 | 25 | 50 | 75 | 100 | 125 | 150 | 175 | 200 | 225 | 250 | 275 | 300 | 325 | 350 |
|---|---|---|---|---|---|---|---|---|---|---|---|---|---|---|---|
| Tech1 |   |   |   |   | 1 | 1 | 1 | 1 | 1 |   |   |   |   |   |   |
| Tech2 |   |   |   |   |   |   |   | 1 | 1 | 1 | 1 |   |   |   |   |
| Tech3 |   |   |   |   |   |   |   |   |   | 1 | 1 | 1 | 1 | 1 |   |
| Tech4 |   |   |   |   |   |   |   |   |   |   |   |   | 1 |   | 1 |
| Tech5 |   |   | 1 | 1 |   |   |   |   |   |   |   |   |   |   |   |
| Tech6 |   |   |   |   |   |   |   |   |   |   |   |   |   |   |   |

FIG. 6

ASSESSING TECHNOLOGIES USING IMAGE-BASED LEARNING ALGORITHMS

BACKGROUND

Technical Field

This disclosure relates generally to using image-based learning algorithms to assess changes of items over time, including technology related to web-based interfaces, according to various embodiments.

Description of the Related Art

Image-based learning algorithms have been used for computing tasks such as automated facial recognition. Usage of these image-based algorithms in other computing domains has not been fully explored, however. Applicant recognizes that image-based techniques may be applicable to other realms of computing, however, such as the analysis of software and technology configuration changes made to particular web sites.

BRIEF DESCRIPTION OF THE DRAWINGS

The following detailed description makes reference to the accompanying drawings, which are now briefly described.

FIG. 4 depicts a representation of an example a 2-D graphical representation that may be generated according to the sample data set in TABLE 1 below, according to some embodiments.

FIG. 5 depicts a representation of an example of the 2-D graphical representation in FIG. 4 with an added tag ("D") in which all values of the added tag are zero, according to some embodiments.

FIG. 6 depicts a representation of an example of a 2-D graphical representation that may be generated according to the sample data set in TABLE 1 above using "Name" as the identifier category, according to some embodiments.

Figure 1:
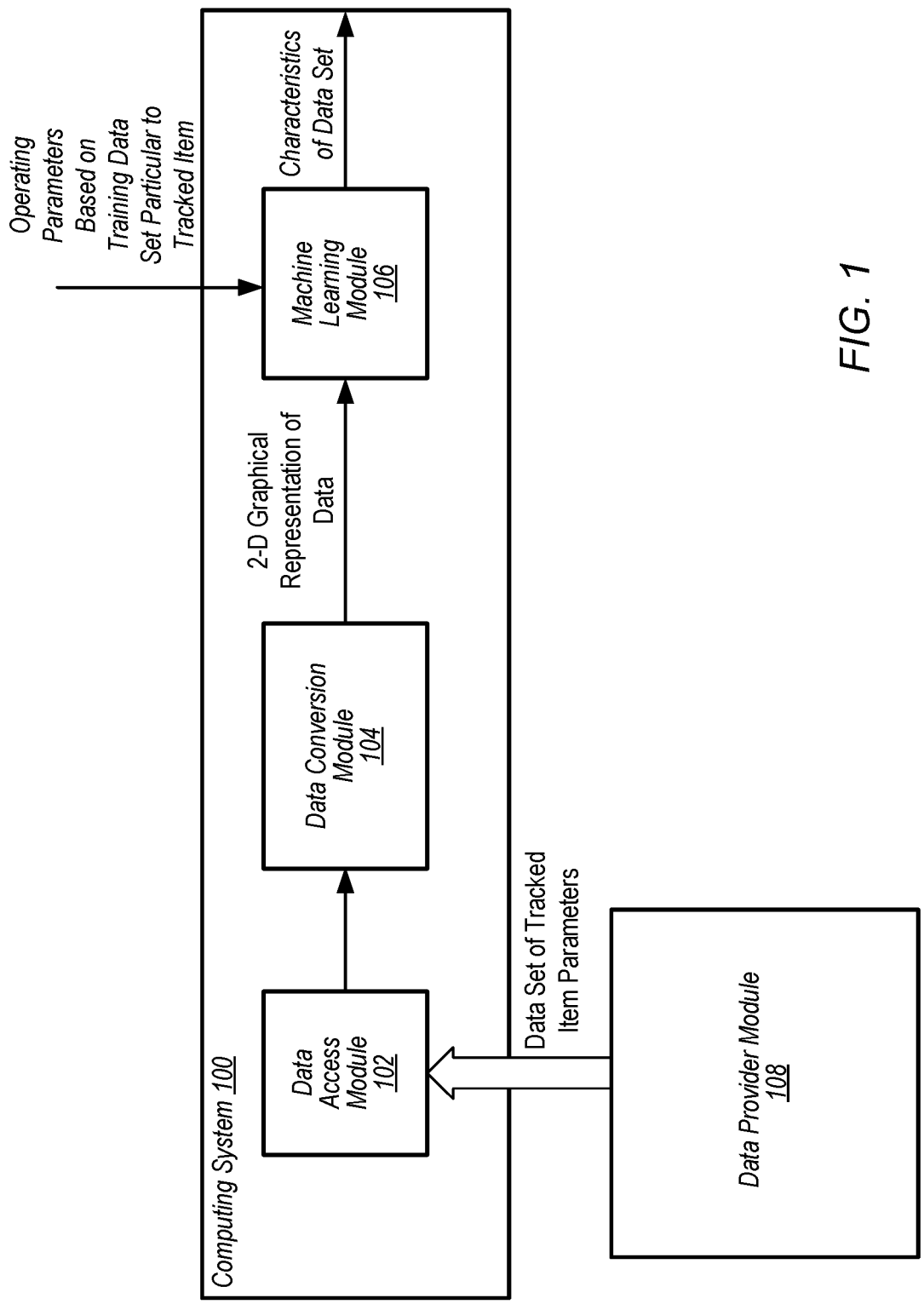
FIG. 1 is a block diagram of a system configured to determine characteristics of a data set of item parameters, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques, including image-based learning algorithm techniques, related to the analysis of data sets that include data that has been tracked over a period of time. For example, a data set may include parameters for an item tracked over a period of time. Activity of these tracked parameters over time may then be analyzed to make decisions or take actions regarding the items. As used herein, the term "item" refers to an object that includes data or parameters that can be tracked or assessed. In certain embodiments, items are web-based items such as web interfaces (e.g., websites), user accounts, or consumer product pages. Items, however, can include non-web-based items such as databases of information stored on a standalone computer system or server, which may or may not be connected to the Internet. Thus, for example, analysis may be performed on the technologies used on a website over time, or on the software services, open network ports, and other configurations of a computer server that provides one or more particular computing services.

As described above, this analysis may be useful for categories of items that include web-based services, user accounts, and consumer product pages. Parameters in web-based services include, for example, web-based technologies such as web server types (e.g. Apache™ Microsoft IIS™, etc.), user interface technologies, security technologies, transaction service technologies, and scripting languages (e.g. JavaScript, PERL, etc.). Parameters in web-based user accounts include user-specific account information such as credit card information or bank card information. Parameters in web-based consumer product pages include parameters such as product sales data, product review ratings, formatting data, price data, and product photograph data.

For many of the items in the above-described categories, a single item may have a number of parameters that are tracked. For example, a single website may implement a number of different technologies. Thus, in many cases, when a data set is created by tracking these parameters over some period of time, the data set includes a large amount of data for analysis. One way that these large data sets (e.g., data sets with technologies for web sites) can be analyzed is by taking a snapshot of the data at a point in time and then analyzing the data snapshot. The data snapshot may include, for example, a look at what technologies are active at a single point in time on a website. The present inventors have recognized that analyzing only a snapshot of the data at a single point in time, however, has limitations for the analysis of the activity of the parameters as there is no analysis of how the activity of the parameters changes or develops over time.

A potential way to analyze the activity of parameters over time and provide more useful information for these large data sets is to use machine learning algorithms (e.g., neural networks) on the data sets. For example, image-based learning algorithms may be used to provide a deeper time-based understanding of the parameters. Image-based learning algorithms utilize data in image formats as input to the learning algorithms to assess features of the data, according to various embodiments. Image-based learning algorithms may include computer vision algorithms or image-based machine learning algorithms and are used to gain a high level of understanding of images and provide decisions (either numeric or symbolic) based on that understanding. One example of an image-based learning algorithm is a deep convolutional neural network (DCNN). DCNNs are used to analyze visual imagery and are known as being shift or space invariant artificial neural networks based on their shared-weights architecture and translation invariance characteristics. For a data set of parameters tracked over time, a DCNN may be time invariant and thus provide useful information about changes or developments in activity of parameters across time. The data sets of parameters tracked over time, however, are not typically acquired or available in a format that can be processed by image-based learning algorithms such as DCNNs. The present disclosure contemplates various techniques for converting data sets of parameters tracked over time into a format that can be utilized in image-based learning algorithms.

Once a data set of parameters tracked over time are converted into a format (e.g. an image) that can be utilized in image-based learning algorithms, an image-based learning algorithm may be used to determine characteristics of the data set based on changes or developments in activity of the parameters over time (e.g., provide an assessment of changes or developments in activity of the parameters across time). An assessment of the parameters that includes changes or developments in activity of the parameters across time may provide a deeper understanding of the data than a snapshot analysis that is limited to only a single point in time. For example, an assessment of parameter activity over time may provide a deeper understanding regarding the progression or regression in the activity of the parameters, which may be useful in making more accurate decisions regarding the items (such as making changes to the items or taking a different approach to the items). Assessment of the parameter activity over time may also provide more accurate predictions about probabilities of outcomes related to the items.

One embodiment described herein has three broad components: 1) accessing a data set that includes parameters tracked over a period of time, 2) generating a two-dimensional graphical representation of the data set that can be used by an image-based learning algorithm, and 3) assessing the converted data set using the image-based learning algorithm to determine characteristics of the data set that are based on activity of the parameters over time. As a non-limiting example, embodiments described herein may determine probabilities and/or predictions on whether implementing a particular web-based technology (e.g., a user interface technology, a formatting technology, a security technology, an encryption technology, a financial service technology, or a scripting or coding language) in a particular web-based interface (e.g., a particular website) will provide a desired result. In particular, a pattern of how web technologies change over time may indicate something about a website—e.g. that it is more likely to have a data loss incident. Such proclivities may be difficult or impossible to detect using a single "snapshot" point in time analysis. This disclosure also discusses example techniques for training an image-based learning algorithm.

FIG. 1 is a block diagram of a system configured to determine characteristics of a data set of item parameters, according to some embodiments. In certain embodiments, computing system 100 includes data access module 102, data conversion module 104, machine learning module 106, and data provider module 108. Data access module 102, data conversion module 104, and machine learning module 106, as described herein, may be implemented as computer-executable instructions and can operate to access a data set from data provider module 108 that includes parameters for an item tracked over a period of time, generate a two-dimensional graphical representation of the data set, and determine characteristics of the data set using the machine learning module.

In certain embodiments, the characteristics determined by machine learning module 106 include a prediction or a probability that is based on an assessment of changes or developments in activity of the parameters over time. The prediction or probability determined by machine learning module 106 may be used to make decisions or take actions regarding the items. For example, the determined characteristics may be used to make decisions about making changes or updates to items such as websites, user accounts, or consumer product pages. In some embodiments, a determined probability may include a probability of an outcome related to an item such as a probability that an operator of a website, a user account, or a consumer product page will integrate one or more new technologies or make other changes. The probability of the outcome may be used, for example, to make decisions on whether to contact the operator or to make changes in marketing directed towards the operator. The disclosure, however, is not limited to these particular examples.

In some embodiments, the characteristics determined by machine learning module 106 include information that can be used to assess progression or regression of an item. For example, characteristics determined for a website may include a determination on whether the operator of the website is upgrading technologies on the website or making other progressive changes to the website. Information that the operator is making upgrades or other progressions to the website may be an indication for success or financial capability of a business associated with the website. The business may then be deemed a better risk for financial investment, such as a business loan, than a business that is not making upgrades or other progressions to its website, which may be indicative of a higher risk of default or failure of the business. In some embodiments, machine learning module 106 may be trained, as described herein, to output the risk for financial investment (e.g., a risk of financial default) as a characteristic determined by the machine learning module.

As shown in the embodiment of FIG. 1, data access module 102 is configured to perform various functions related to accessing data for computing system 100 (e.g., accessing a data set of tracked item parameters). In certain embodiments, data access module 102 receives data from data provider module 108. Data provider module 108 may operate to acquire and track (e.g., assess) data or information using the Internet.

Figure 2:
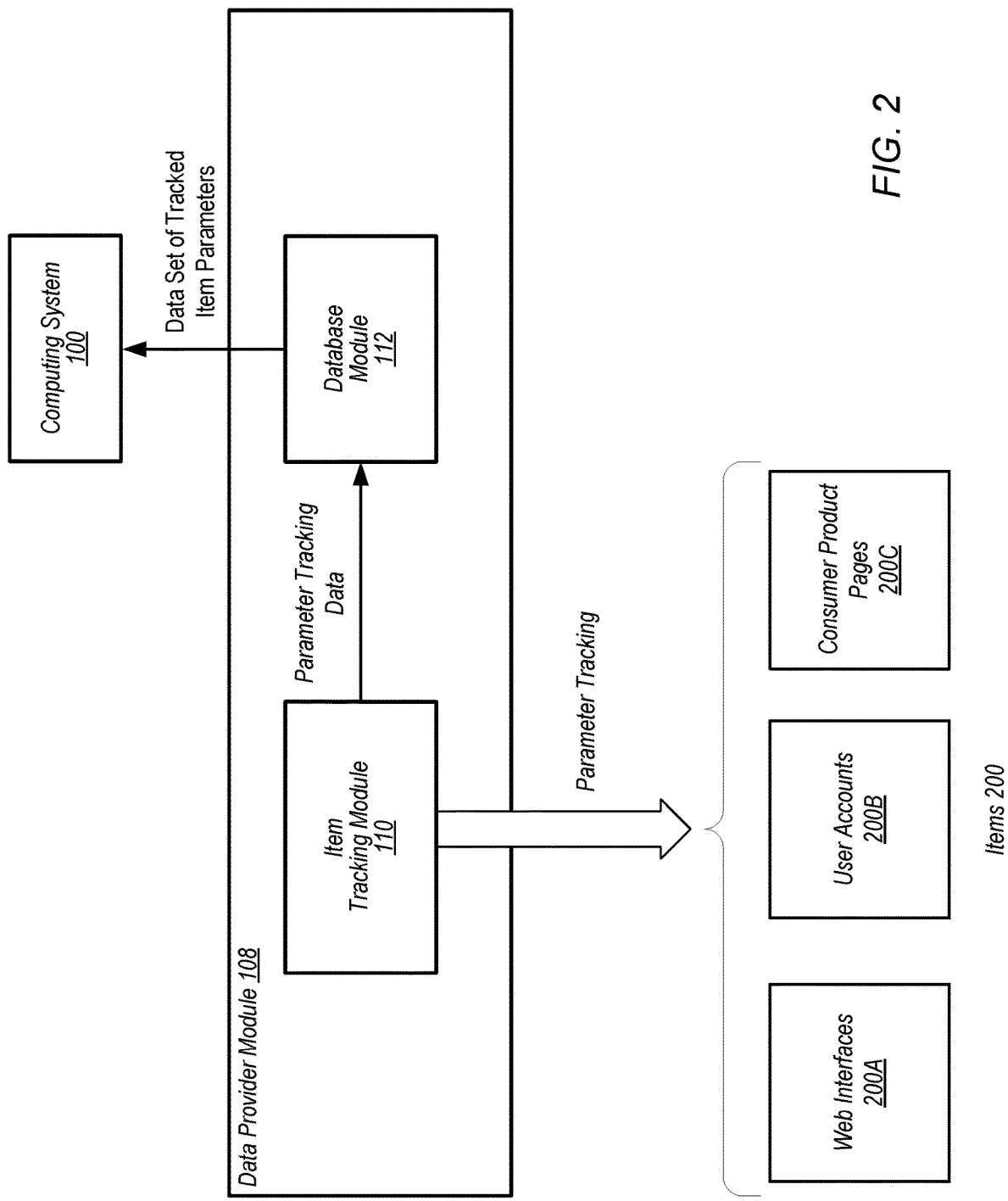
FIG. 2 depicts a block diagram of a data provider module, according to some embodiments.

FIG. 2 depicts a block diagram of data provider module 108, according to some embodiments. The embodiment of data provider module 108 depicted in FIG. 2 presents one non-limiting example of an embodiment of a data provider module that may be used by data access module 102 to access data for computing system 100. In some embodiments, data provider module 108 is operated by a data service provider. For example, data provider module 108 may be operated by a separate party from computing system 100 (e.g., a third-party data provider relative to computing system 100). In some embodiments, data provider module 108 may be operated by the party associated with computing system 100 or operated by computing system 100 itself. These modules, as with other modules mentioned herein, may be implemented as stored executable computer instructions.

As shown in the embodiment depicted in FIG. 2, data provider module 108 may include item tracking module 110 and database module 112. Item tracking module 110 may track (e.g., assess) parameters on one or more items 200. Items 200 may include web interfaces 200A, user accounts 200B, and consumer product pages 200C, although the disclosure is not limited to these particular examples. Web interfaces 200A may include, for example, websites or other interfaces accessed via the Internet. In certain embodiments, parameters tracked from web interfaces 200A include technologies implemented in a web interface. Implemented technologies may include web technologies such as web server types, user interface technologies, technology products (e.g., security technologies and transaction service technologies), widgets, scripting or coding languages (e.g., HTML, JavaScript, ASP, JSP, PHP, Perl, Tcl, CSS, and Python), formatting technologies, encryption technologies, although the disclosure is not limited to these particular examples.

User accounts 200B may include, but not be limited to, user accounts associated with transaction services or security services, but may be other types of user accounts in various embodiments. Parameters tracked from user accounts 200B may include user account parameters associated with a web-based service such as credit card information, bank account information, and other user-specific information, although the disclosure is not limited to these particular examples. Consumer product pages 200C may include, but not be limited to, a listing of consumer products. The consumer products may be listed for sale, use, or review. Parameters tracked from consumer product pages 200C may include the sale (e.g., product sales data), use (e.g., product use data), review ratings, formatting data, price data, and product photograph data (e.g., number of product photographs for products listed on a consumer product page), although the disclosure is not limited to this particular example. (One or more of these pages may also be included in web interfaces 200A in some embodiments).

In certain embodiments, tracking of parameters includes tracking (e.g., assessing) the parameters over time. Tracking the parameters over time may include, for example, tracking times of changes in activity associated with the parameters. For example, tracking parameters may include tracking start and end points (e.g., first detection time and last detection time) of when a technology is active on a web interface. As another example, tracking parameters may include tracking of when credit card information or bank information is added or removed in a user account. Adding or removing of credit card information or bank information may be tracked based on detected times of the information existing in the user account. Yet another example of tracking a parameter may include tracking of when a sale listing on a consumer product page goes active (e.g., time sale listing is detected), when products listed are sold (e.g., detected time of sale), or when the sale listing is removed (e.g., time sale listing is no longer detected). Other embodiments for tracking of parameters over time may also be contemplated as the disclosure may not be limited to these particular examples.

In certain embodiments, the parameters are tracked corresponding to time intervals. For example, a parameter's activity (e.g., active or inactive) may be assessed at a first point of time (e.g., time=0) and then the parameter's activity is assessed at additional time values that are defined by time intervals. In some embodiments, the parameter's activity may be assessed or sampled at time values that incrementally increase. For example, the time intervals may include time values that increase monotonically as an organized series (e.g., 0 milliseconds, 50 milliseconds, 100 milliseconds, 150 milliseconds, 200 milliseconds, 250 milliseconds, etc.). Other time intervals with different spacing between time values (e.g., different resolutions of time) are also contemplated for embodiments disclosed herein. Thus, larger tracking time intervals may also be used in various embodiments, e.g., 30 minutes, an hour, day, week, month, or some other interval.

In some embodiments, tracking of a parameter may include other identifying information in addition to assessment of activity of the parameter. For example, tracking of a technology parameter may also include an identifier for the technology (e.g. a name or a tag). The tag may be a category description or another descriptive identifier for the technology. For user account information, additional tracked information may include, for example, user name, category (e.g., credit account or bank account), or other identifying information for the user. For product pages, additional tracked information may include, for example, product name, product category, product price, or other product identifying information.

As shown in FIG. 2, parameter tracking data obtained by item tracking module 110 may be provided to database module 112 in data provider module 108. Database module 112 may store the parameter tracking data until computing system 100 accesses a data set of tracked item parameters from data provider module 108. As shown in FIG. 1, data access module 102 accesses the data set of tracked item parameters for computing system 100. Once the data set is accessed (e.g., received), data access module 102 may provide the data set to data conversion module 104.

Figure 3:
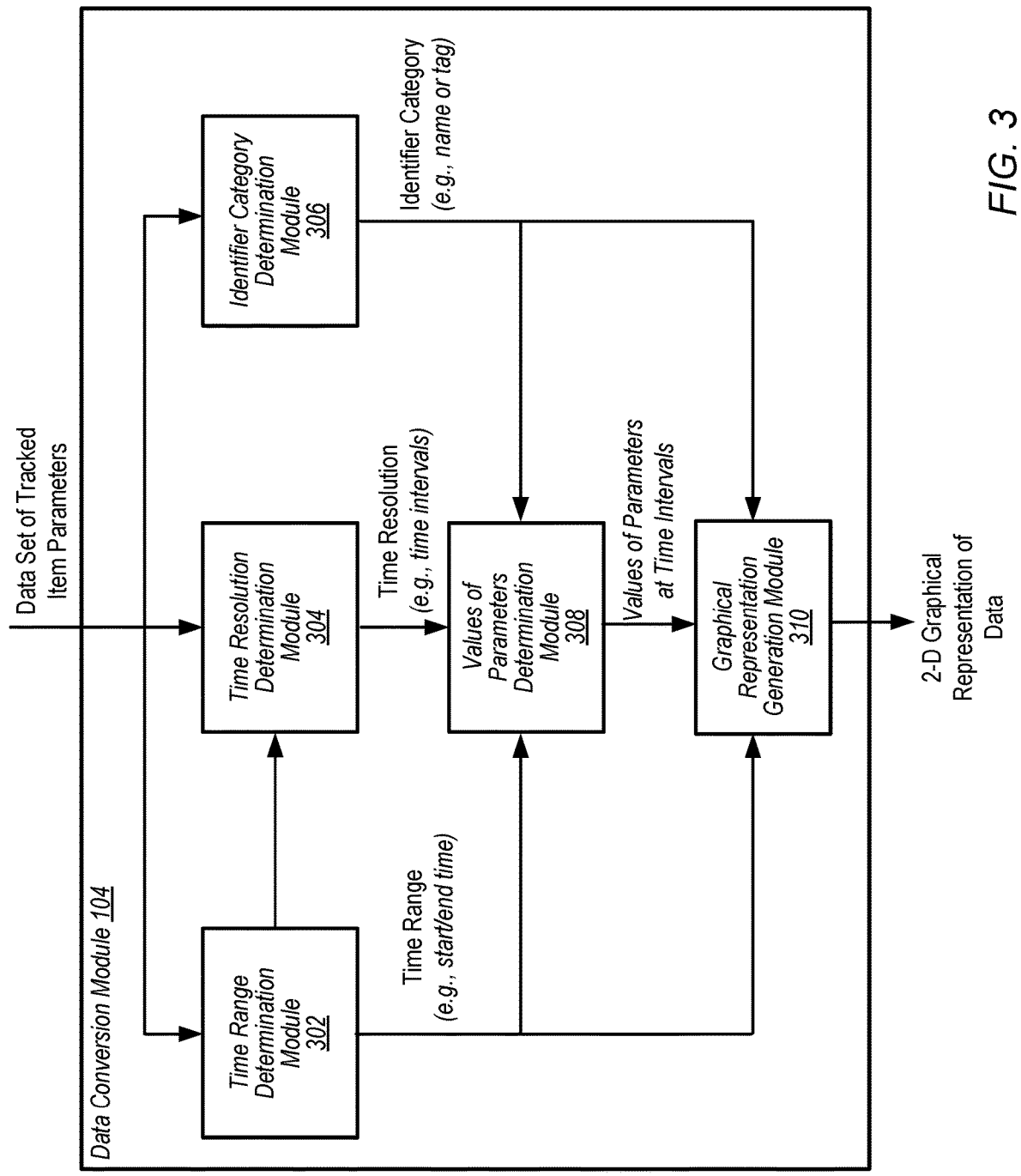
FIG. 3 depicts a block diagram of a data conversion module, according to some embodiments.

FIG. 3 depicts a block diagram of data conversion module 104, according to some embodiments. Once the data set of tracked item parameters is provided to data conversion module 104, the data conversion module may operate to convert the data set to a two-dimensional (2-D) graphical representation of the data. TABLE 1 illustrates an example data set for technologies implemented on a website:

TABLE I

| Name | Tag | First Detected | Last Detected |
|---|---|---|---|
| Tech 1 | A | 100 | 200 |
| Tech 2 | B | 150 | 250 |
| Tech 3 | C | 200 | 300 |
| Tech 4 | A | 250 | 350 |
| Tech 5 | B | 50 | 75 |

*It should be noted that while the data set is depicted herein in a table format, the data set may be in any format that includes the information for the parameters and item. For example, the data set may be a list or in a schema format.

As shown in FIG. 3, data conversion module 104 may include time range determination module 302. Time range determination module 302 may determine a time range (e.g., a time period) for the data set. The time range may be determined by selecting a beginning and end time to apply to the data set. For example, for the data set in TABLE 1, the time range may be set from 0 to 350 to include all detected times of technologies. The time range may be determined as any range suitable for the data set including seconds, minutes, hours, days, weeks, months, etc.

Time resolution determination module 304 may determine a time resolution for the data set. In some embodiments, the time range may be used as input for time resolution determination module 304. The time resolution may be determined by selecting time intervals for the data set (e.g., the spacing between time values for the data set). In some embodiments, the time resolution may be determined based on the time intervals for the tracking of the parameters. The time resolution may be selected to include time values that increase monotonically as an organized series that is on the order of the intervals that the parameters are tracked, as described above. For example, for the data set in TABLE 1, the time intervals may be selected as 25 such that the time intervals include the first detected and last detected times. The time resolution may also be set to correspond to the time range (e.g., time intervals are set as divisions of the time range in seconds, minutes, hours, days, weeks, months, etc.).

Identifier category determination module 306 may be determine an identifier category for the data set. The identifier category may be selected from the identifying information that is tracked in addition to the assessment of activity of the parameter. For example, for a technology, the identifier category may be selected to be a name or a tag of the technology. In certain embodiments, only a single identifier category is selected for the data set (e.g., only one of a name or tag is selected to be used with the data set). Each parameter in the data set is then labelled by its identifier (e.g., by its name or tag) according to the identifier category.

Once the time range, time resolution, and identifier category are determined, values of parameters determination module 308 may determine values for the parameters (which are labelled by their identifiers). The time range, time resolution, and identifier category may be provided as input for values of parameters determination module 308. In certain embodiments, the values of the parameters are set as binary values. For example, for technologies, the value is 1 for a technology being active or 0 for a technology being inactive. As another example, for credit card information, the value is 1 when particular credit card information is present in a user account and the value is 0 when the credit card information is not present in the user account. In some embodiments, non-binary parameter values can also be used. For example, if a particular tracked technology is whether a web server is running a copy of the Apache™ HTTP server, values could be 0 if this software is not present, 1 for a first version of the software, 2 for a second version of the software, etc. These non-binary values, if represented in an image format for purposes of analysis, could be represented as color schemes (e.g. instead of white for 0 and black for 1 in a binary scheme, grey scale or different color shades could be used to indicate multiple different possible values for a tracked parameter).

Once the values of the parameters are determined, the values of the parameters, along with the time range, time resolution, and identifier category, may be provided to graphical representation determination module 310. Graphical representation determination module 310 may generate a 2-D graphical representation of the data set based on the values of the parameters, the time range, the time resolution, and the identifier category. The 2-D graphical representation may have characteristics similar to a Gantt chart. A Gantt chart is a graphical representation that lists the tasks to be performed on the vertical axis (y-axis) and time intervals on the horizontal axis (x-axis) where the width of the horizontal bars in the graphical representation shows the duration of the activity of each task. In certain embodiments, the 2-D graphical representation generated by graphical representation determination module 310 lists parameters on the vertical axis (y-axis) and time intervals on the horizontal axis (x-axis) where the width of the horizontal bars in the graphical representation shows the duration of the activity of each parameter. Thus, the 2-D graphical representation generated by graphical representation determination module 310 may be referred to as a "pseudo-Gantt chart" in some embodiments.

As described above, the 2-D graphical representation may have a first dimension (e.g., the y-axis) that is indicative of the values of the parameters. Coordinates along the first dimension may correspond to the identifiers for the parameters (e.g., the identifiers provide the points along the y-axis). A second dimension (e.g., the x-axis) may be indicative of a time period (e.g., the time range) for the data set. Coordinates along the second dimension may correspond to time intervals for the time period (e.g., the time intervals are the points along the x-axis). Points at the intersection of coordinates for the first dimension and coordinates for the second dimension may be pixels (or dots) in the 2-D graphical representation of the data set. Thus, using binary values for the values of the parameters, the points may be white or black pixels depending on the value of the parameter at each point. As noted above, however, in some embodiments greyscale or color schemes can also be used when non-binary values are possible for one or more particular parameters—e.g. for greyscale, a first value could be represented as white, a second value as light grey, a third value as dark grey, and a fourth value as black, as just one example.

FIG. 4 depicts a representation of an example a 2-D graphical representation that may be generated according to the sample data set in TABLE 1 above, according to some embodiments. In FIG. 4, the identifier category is set as the tag for the technologies. Thus, the y-axis has coordinates of A, B, C tags while the x-axis has time ranging from 0 to 350 at intervals of 25. FIG. 4 depicts a representation of an example a 2-D graphical representation that may be generated according to the sample data set in TABLE 1 above, according to some embodiments. In FIG. 4, the identifier category is set as the tag for the technologies. Thus, the y-axis has coordinates of A, B, C tags while the x-axis has time ranging from 0 to 350 at intervals of 25. Note that for purposes of these examples, these time intervals can be considered arbitrary, as any desired time interval can be used in various embodiments, and indeed different time intervals can even be used for different parameters if desired. Thus, one parameter might be tracked every 2 hours, while a different parameter is tracked every 24 hours, as just one example.

As shown in FIG. 4, points in time when a tag is active (e.g., a technology associated with the tag is active) have a binary value of 1 and the pixel (rectangle) is shaded black (it should be understood that the value of "1" shown in the pixels is representative and that the "1" may not be depicted in an actual 2-D graphical representation of the data set). Correspondingly, points in time when a tag is inactive (e.g., no technology associated with the tag is active) have a binary value of 0 and the pixel remains white. With the pixels shaded either black or white, the 2-D graphical representation may be a 2-D image representation of the data set that is usable in image-based learning algorithms described herein.

In many instances, the number of parameters that are tracked is large and there may be identifiers that do not have any activity for an item (e.g., a website may not utilize all technologies or tags that are being tracked). In such cases, the identifiers (e.g., tags) may be added to the image with the values being all zeros (e.g., white pixels) for the identifier. FIG. 5 depicts a representation of an example of the 2-D graphical representation in FIG. 4 with an added tag ("D") in which all values of the added tag are zero, according to some embodiments.

As another example, FIG. 6 depicts a representation of an example of a 2-D graphical representation that may be generated according to the sample data set in TABLE 1 above using "Name" as the identifier category, according to some embodiments. As shown by a comparison of the 2-D graphical representations in FIGS. 4-6, the configuration of the representation may vary depending on the identifier category and the number of identifiers used in the representation.

In some embodiments, values of some data may be missing in the 2-D graphical representation. For example, the data set accessed by computing system 100 may be missing data due to inconsistencies in the data tracking by the data provider module or the data does not extend to the time period needed for the graphical representation. In such embodiments, missing data issues may be resolved by interpolating data (e.g., filling in pixels with data consistent on either side of the missing pixel), extrapolating data (e.g., continue trends from earlier time intervals to later time intervals), or filling the missing data with 0 values. Filling the missing data with 0 values may work in some instances, especially with large amounts of data where the machine learning module has sufficient information from other pixels to overcome the missing data points.

In some embodiments, the values of the parameters at the time intervals determined by values of parameters determination module 308, shown in FIG. 3, may be set as scalar values instead of binary values. For example, in an embodiment using technologies from websites as parameters, scalar values may be used to represent minor differences between variants of a particular technology. In the 2-D graphical representation of scalar values, variations in intensity or color (as discussed above) may be used to represent the scalar values. For example, varying intensity in grey between white and black may be used to represent scalar values between 0 and 1. As another example, different colors and or color shades could be used for different versions of a software technology (e.g., one shade of green for version 2.1 of a software technology versus another shade of green for version 2.0 of the software technology). Other embodiments for variations in intensity or color to represent scalar values of parameters may also be contemplated as the disclosure may not be limited to these particular examples.

Returning to FIG. 1, the 2-D graphical representation of the data set may be provided to machine learning module 106. Machine learning module 106 may include any combination of hardware or software (e.g., program instructions) located in computing system 100. Machine learning module 106 may be, for example, a neural network module. In certain embodiments, machine learning module 106 implements an image-based learning algorithm. Machine learning module 106 may implement, for example, a deep convolutional neural network (DCNN) module that utilizes one or more convolutional layers. In some embodiments, machine learning module 106 implements convolutional layers in combination with one or more additional layers including, but not limited to, pooling layers, flattening layers, or connecting layer. In certain embodiments, the time range, time resolution (e.g., time intervals), and identifier category determined by data conversion module 104 are used as hyperparameters for algorithms used in machine learning module 106. As shown in FIG. 1, the output of machine learning module 106 may be characteristics of the data set determined from the input of the 2-D graphical representation of the data set. In certain embodiments, the output characteristics include a relationship between activity of one or more of the parameters for the item (e.g., technologies for a web site) over one or more of the time intervals.

Machine learning module 106 may be a trained machine learning module where the machine learning module has been trained to classify the image-based input (e.g., the 2-D graphical representation of the data set) to provide the output characteristics. Machine learning module 106 may include machine learning circuitry installed or configured with operating parameters that have been learned by the machine learning module itself or a similar machine learning module (e.g., a machine learning module operating on a different processor or device). For example, machine learning module 106 may be trained using training data (e.g., reference data) to generate operating parameters for the machine learning circuitry. The operating parameters generated from the training may then be used to operate machine learning module 106 (or used on another similar machine learning module).

Figure 7:
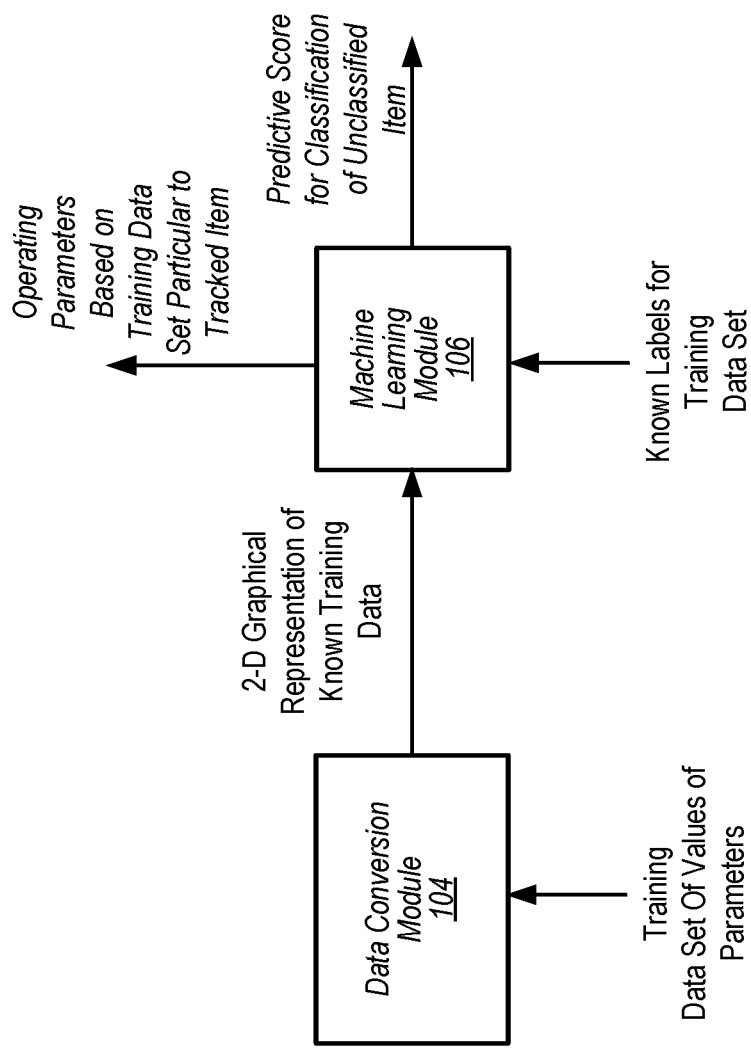
FIG. 7. depicts a block diagram illustrating a system configured to train a machine learning module, according to some embodiments.

FIG. 7. depicts a block diagram illustrating a system configured to train machine learning module 106, according to some embodiments. A training data set that indicates values for parameters corresponding to time intervals (e.g., activity of parameter at various time intervals) may be provided to data conversion module 104. In certain embodiments, the training data set is selected to train machine learning module 106 for a particular item (e.g., a particular web interface). Thus, each different type of item may have its own corresponding training data set. The training data set may be in a format substantially similar to the data set of tracked parameters accessed from data provider module 108 by data access module 102 (shown in FIG. 1). The parameters in the training data set may correspond to one or more classification categories associated with machine learning module 106.

As shown in FIG. 7, data conversion module 104 may generate a 2-D graphical representation of the training data set according to embodiments described herein. The 2-D graphical representation of the training data set may then be provided to machine learning module 106. Known labels for the training data set may also be provided to machine learning module 106. The known labels may include labels of known information that correspond to one or more subsets of the training data set. Thus, for a training data set for a particular item (e.g., a particular web interface), the known labels include labels selected based on the information that machine learning module 106 is attempting to predict (e.g., what the predictive score, described below, is attempting to describe). For example, for a financial transaction service, machine learning module 106 may be trained to attempt to predict a risk of a customer (e.g. merchant) who owns a particular web interface leaving the financial transaction service for another platform, a risk of a particular web interface being compromised by a malicious actor (e.g. a security breach), or a risk for increased chargeback on a web interface (e.g., risk for a customer demanding a refund because the web interface operator did not or could not deliver a product or service where the risk may be foretold by changes in the web interface structure beforehand).

Based on the input of the 2-D graphical representation of the training data set and the known labels, machine learning module 106 can then be trained to generate a predictive score. The predictive score may be a score that indicates whether an unclassified item corresponds to at least one of the classification categories associated with machine learning module 106. In some embodiments, the predictive score is a probability that the unclassified item corresponds to at least one of the classification categories associated with machine learning module 106 (e.g. a score ranging from 0-100 or some other range). In some embodiments, the predictive score may be a binary decision (e.g., yes/no) that the unclassified item corresponds to at least one of the classification categories associated with machine learning module 106.

In some embodiments, training of machine learning module 106 includes optimization of operating parameters (e.g. classifiers) used in the machine learning module to generate the predictive score. For example, a score may be provided on the known labels input into machine learning module 106. Machine learning module 106 may then be optimized by determining operating parameters that generate a predictive score that is as close to the score input on the known labels as possible. The operating parameters for the training data set for the particular item may then be used to operate machine learning module 106 for tracked data, as shown in FIG. 1.

Turning again to FIG. 1, machine learning module 106 outputs characteristics of the data set accessed by data access module 102 based on the 2-D graphical representation of the data set and the input operating parameters. As described above, in certain embodiments, the output characteristics include a relationship between activity of one or more of the parameters for the item over one or more of the time intervals. In some embodiments, the output characteristics include a probability or probability score that an event is or will occur based on the data set of tracked item parameters. For example, an output characteristic may be a probability or likelihood that an entity corresponding to a particular web interface (e.g., a merchant) will decide to use a particular financial transaction service that facilitates electronic payments. Other examples of output characteristics include, but are not limited to, risks of fraud, risks of malicious behavior, risks of financial default, (e.g. loan default), security risks, sales probabilities (e.g., a probability that a customer will buy a service or product), and probabilities of successful integration of technologies in items (e.g., in web interfaces, product pages, or user accounts). In some embodiments, characteristics including risks may be output as a probability related to the risk (e.g., a probability of fraud, malicious behavior, financial default, or security breach).

In some embodiments where characteristics associated with technologies on web interfaces are determined, the output characteristics may include a prediction or a probability that a selected technology is suitable for implementation in the web interface. For example, the output characteristic may be a prediction or a probability that implementation of the selected technology in the web interface will be successful or provide a desired result (either commercially or operationally). In some embodiments, the output characteristic may include a probability of an outcome related to an item such as a probability that an operator of a website, a user account, or a consumer product page will integrate one or more new technologies or make other changes. In some embodiments, the output characteristic may be a probability determined based on a relationship between two or more of the technologies.

Figure 8:
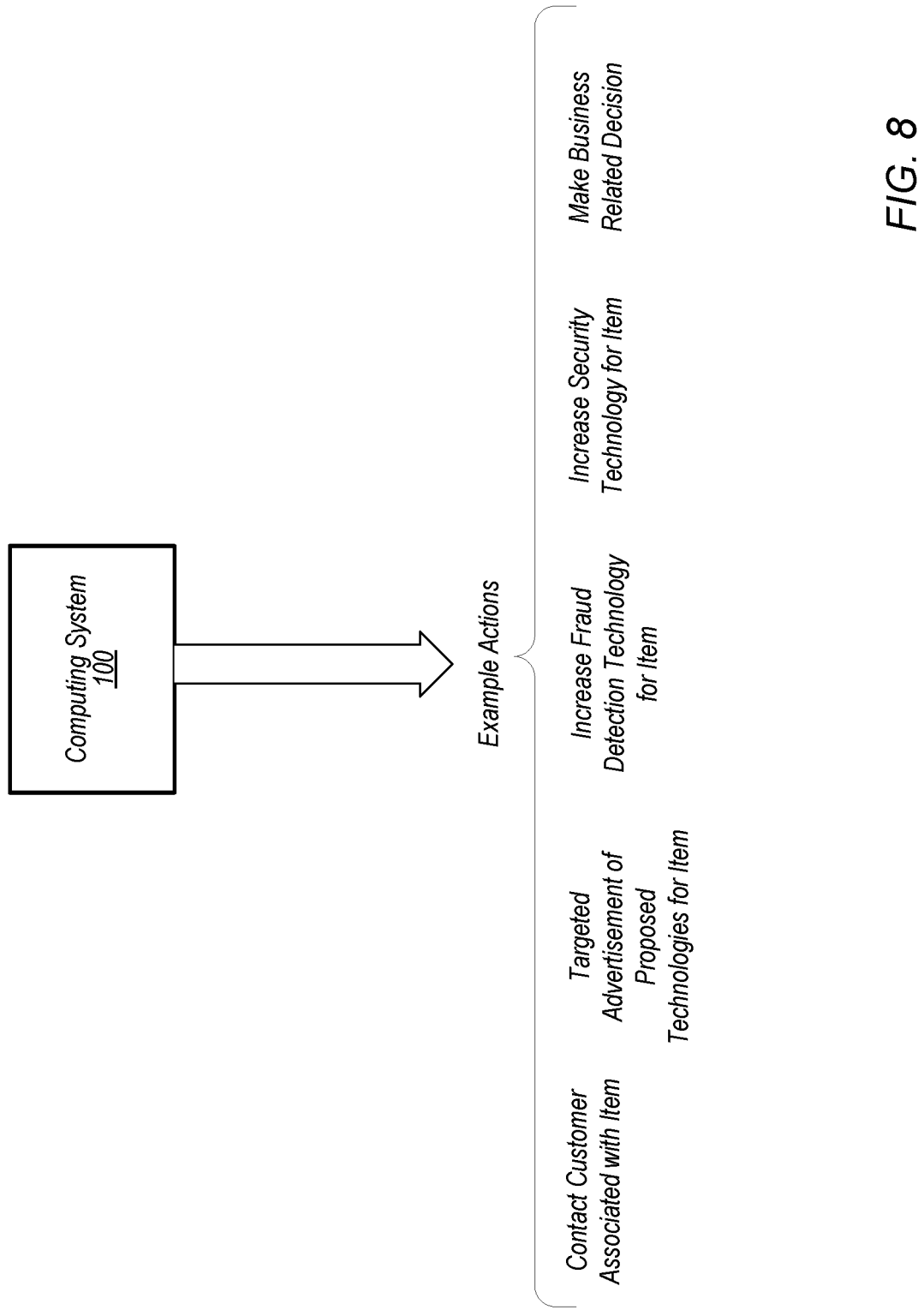
FIG. 8 depicts a block diagram illustrating example actions for items that may be implemented based on characteristics output from a machine learning module, according to some embodiments.

In certain embodiments, one or more actions may be implemented based on the characteristics output from machine learning module 106. FIG. 8 depicts a block diagram illustrating example actions for items that may be implemented based on characteristics output from a machine learning module, according to some embodiments. The example actions depicted in FIG. 8 are provided as non-limiting examples as other embodiments for actions are also contemplated.

As shown in FIG. 8, one example action that may be taken includes, but is not limited to, contacting a customer associated with the item (e.g., the customer associated with the web interface). The customer may be contacted to attempt to sell the customer a technology product (e.g., a financial security product or financial transaction product), alert the customer to risks such as possible fraud or malicious behavior, or provide other service notices to the customer. For example, the probability that an operator of a web site, a user account, or a consumer product page will integrate one or more new technologies or make other changes may be used to determine whether to contact the operator or to make changes in marketing directed towards the operator. For user accounts, contacting the customer may include providing notice of risks for fraud or malicious behavior in a user account. For product pages, contacting the customer may include providing notice of risky sales behavior or predictions of changes in sales.

Another example action is to provide targeted advertisement of proposed technologies to an item. For example, a web interface may be targeted with advertisements for financial security or financial transaction products that may be suitable for use in the web interface. Similarly, a user account may be targeted with advertisements for technologies that may be useful for the holder of the user account. For product pages, targeted advertisements may be provided to promote products that can increase sales or provide more efficient sales platforms.

Other example actions include increasing fraud detection technology or increasing security technology for the item. For example, if the characteristics predict the potential for fraud or security breaches are increased for the item, action may be taken to increase fraud or security protections for the item. As a specific example, security protections for a login interface may be increased if a high probability for malicious login attempts is determined by the machine learning module.

Yet another example includes making a business-related decision for the item. For example, a decision on providing support for a business (such as financial support or operational support) may be based on a determination of risk associated with the business. Risks that may be used in the decision include, but are not limited to, risks of fraud, risks of malicious behavior, risks of financial default, (e.g. loan default), and security risks.

Example Methods

Figure 9:
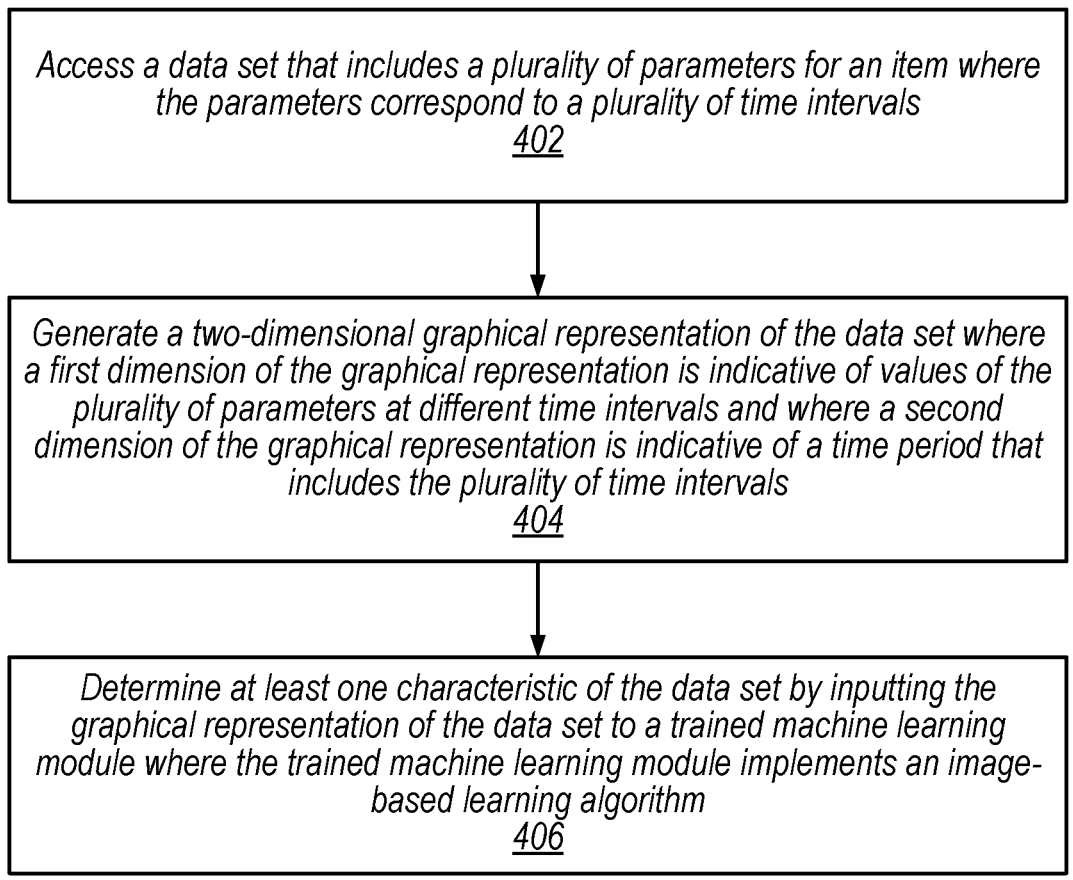
FIG. 9 is a flow diagram illustrating a method for determining characteristics of data sets that include parameters tracked over time for items such as web interfaces, user accounts, or consumer product pages, according to some embodiments.

FIG. 9 is a flow diagram illustrating a method for determining characteristics of data sets that include parameters tracked over time for items such as web interfaces, user accounts, or consumer product pages, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing system 100.

At 402, in the illustrated embodiment, a computing system accesses a data set that includes a plurality of parameters for an item where the parameters correspond to a plurality of time intervals. Time intervals may be time intervals in a time range or time period.

At 404, in the illustrated embodiment, the computing system generates a two-dimensional graphical representation of the data set where a first dimension of the graphical representation is indicative of values of the plurality of parameters at different time intervals and where a second dimension of the graphical representation is indicative of a time period that includes the plurality of time intervals.

At 406, in the illustrated embodiment, the computing system determines at least one characteristic of the data set by inputting the graphical representation of the data set to a trained machine learning module where the trained machine learning module implements an image-based learning algorithm. In some embodiments, the at least one characteristic is a relationship between one or more of the parameters for the item over one or more of the time intervals. In some embodiments, the at least one characteristic is a probability of an event occurring based on the data set. In some embodiments, an action corresponding to the item is implemented based on the at least one characteristic.

Figure 10:
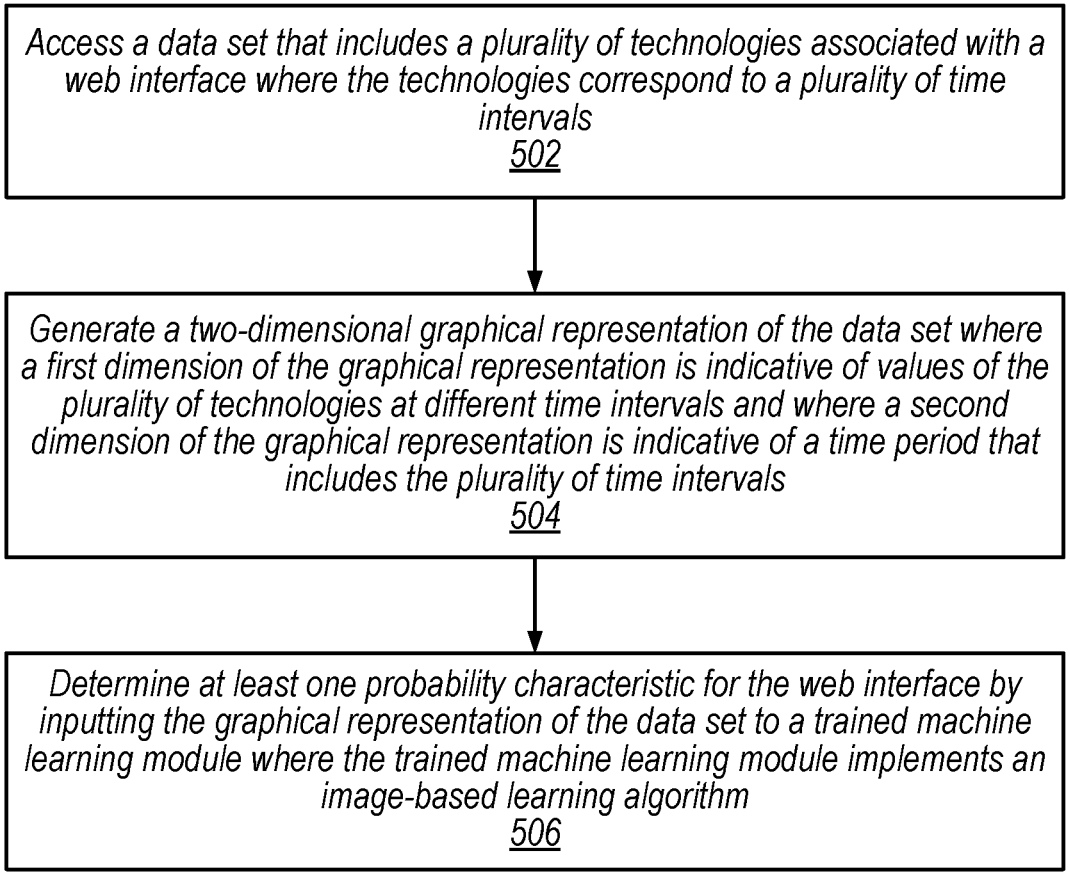
FIG. 10 is a flow diagram illustrating a method for determining characteristics of data sets that includes technologies associated with a web interface tracked over time, according to some embodiments.

FIG. 10 is a flow diagram illustrating a method for determining characteristics of data sets that includes technologies associated with a web interface tracked over time, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing system 100.

At 502, in the illustrated embodiment, a computing system accesses a data set that includes a plurality of technologies associated with a web interface where the technologies correspond to a plurality of time intervals. Time intervals may be time intervals in a time range or time period.

At 504, in the illustrated embodiment, the computing system generates a two-dimensional graphical representation of the data set where a first dimension of the graphical representation is indicative of values of the plurality of technologies at different time intervals and where a second dimension of the graphical representation is indicative of a time period that includes the plurality of time intervals.

At 506, in the illustrated embodiment, the computing system determines at least one probability characteristic for the web interface by inputting the graphical representation of the data set to a trained machine learning module where the trained machine learning module implements an image-based learning algorithm. In some embodiments, the at least one probability characteristic includes a probability that a selected technology is suitable for implementation in the web interface. In some embodiments, the at least one probability characteristic is determined based on a relationship between at least two of the technologies.

Figure 11:
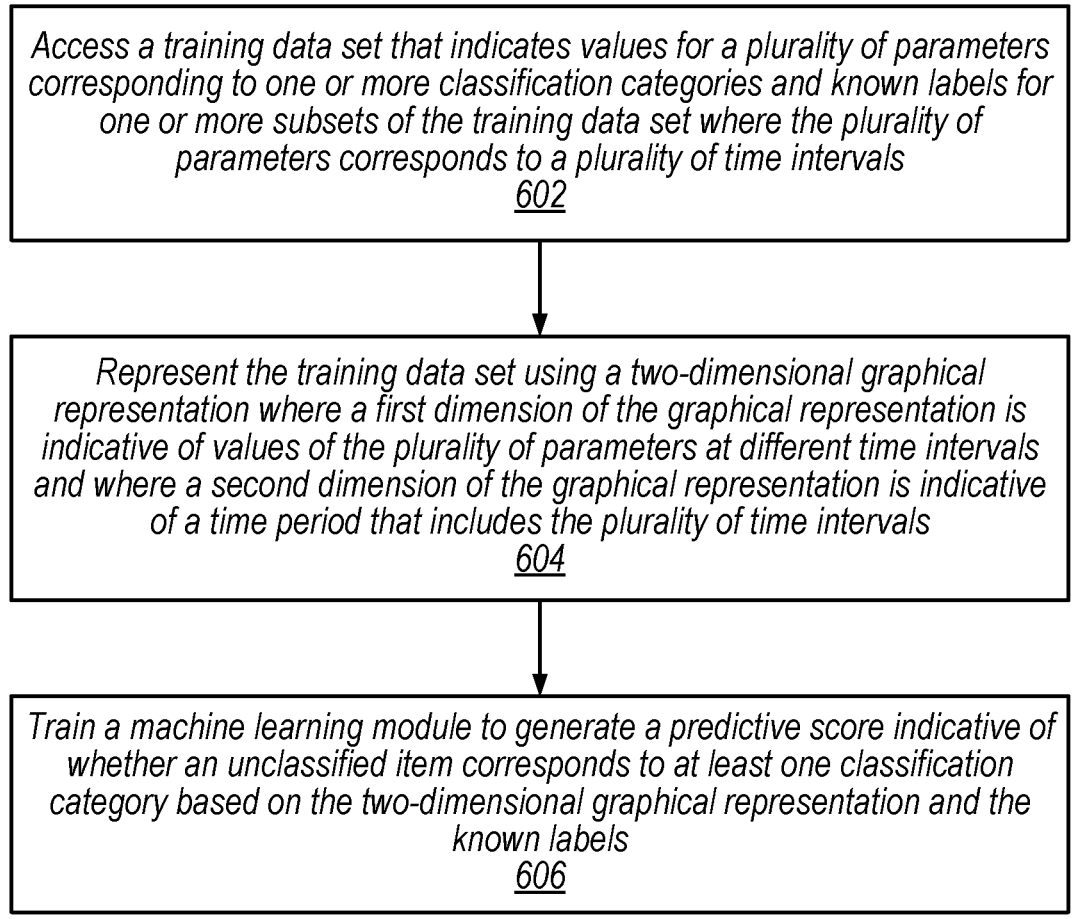
FIG. 11 is a flow diagram illustrating a method for training a machine learning module to generate a predictive score for classifying an item, according to some embodiments.

FIG. 11 is a flow diagram illustrating a method for training a machine learning module to generate a predictive score for classifying an item, according to some embodiments. The method shown in FIG. 11 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing system 100.

At 602, in the illustrated embodiment, a computing system accesses a training data set that indicates values for a plurality of parameters corresponding to one or more classification categories and known labels for one or more subsets of the training data set where the plurality of parameters corresponds to a plurality of time intervals. Time intervals may be time intervals in a time range or time period.

At 604, in the illustrated embodiment, the computing system represents the training data set using a two-dimensional graphical representation where a first dimension of the graphical representation is indicative of values of the plurality of parameters at different time intervals and where a second dimension of the graphical representation is indicative of a time period that includes the plurality of time intervals.

At 606, in the illustrated embodiment, the computing system trains a machine learning module to generate a predictive score indicative of whether an unclassified item corresponds to at least one classification category based on the two-dimensional graphical representation and the known labels. In some embodiments, the predictive score is indicative of a probability that the unclassified item corresponds to the at least one classification category.

Non-Limiting Example of Machine Learning Module

A machine learning module may implement a deep convolutional neural network (DCNN) as an image-based learning algorithm in determining determine characteristics of the 2-D graphical representation input into the machine learning module. The DCNN may be time invariant with respect to the data represented in the 2-D graphical representation. A DCNN can be applied to the sequential data represented in the 2-D graphical representation by using a special version of a key module (e.g., a one-dimensional convolutional layer). We begin by having a discrete input function $g(x) \in [1,l] \to \mathbb{R}$ and a discrete kernel function $f(x) \in [1,l] \to \mathbb{R}$, the convolution $h(y) \in [1, (l-k+1)/d] \to \mathbb{R}$ between $f(x)$ and $g(x)$ with stride d is defined by:

$$h(y) = \sum_{x=1}^{k} f(x) \cdot g(y \cdot d - x + c)$$

where $c=k-d+1$ is an offset constant. The module can be parameterized, just as done in traditional convolutional networks in image-based algorithms, by a set of such kernel functions $f_{ij}(x)$ (i=1, 2, ..., m and j=1, 2, ..., n) which can be called weights, on a set of inputs $g_i(x)$ and outputs $h_j(y)$. Each $g_i$ (or $h_j$) input (or output) can be called features, and m (or n) input (or output) feature size. The outputs $h_j(y)$ is determined by a sum over i of the convolutions between $g_i(x)$ and $f_{ij}(x)$.

In this case, the stride (d) may be made to always be 1 and the kernel size (k) may be varied as the size of the input (l) since the same kernels runs across all of the technologies or tags makes any shuffle across the x-axis irrelevant. Another hyperparameter of the layer is the number of kernels. N kernels are being assigned to extract features out of the raw data, which basically gives N of $f(x)$.

In the machine learning module, the module is attempting to learn the kernels (e.g., the relations between different technologies or tags over time). Thus, the machine learning module can be used in a variety of tasks including, as an example, a likelihood that a customer will implement (e.g., signup or join) a financial transaction service. In this example, a data set may include x-features that are websites and y-features that are a binary label where "1" stands for "the customer has eventually joined the financial transaction service" and "0" stands for "after a phone call, the potential customer has refused to join the financial transaction service".

The x-features (e.g., the website) may go through a conversion into the 2-D graphical representation of the data set and then applied to the machine learning module. The hyperparameters for the conversion and the machine learning module may be set as: Identifier="Tags", time range=384 samples, time intervals=weeks. The machine learning module may then be constructed with the following algorithm parameters:

Convolutional Layer (N=30, k=3);
Max Pooling (stride=2);
Convolutional Layer (N=30, k=3);
Max Pooling (stride=2);
Convolutional Layer (N=15, k=3);
Flattening the fine-grained features;
Fully connected layer (15 neurons); and
One output layer with one neuron (binary classification).

The following provides an example of the machine learning module operating using the above algorithm parameters on the above described data set:

1. In the first convolutional layer: for each tag (28 tags), the machine learning module learns 30 kernels where the size of each kernel is (k=3). In addition, the machine learning module learns 30 biases. It means that the total numbers of trainable parameters are 3×28×30+30=2550. The output of this layer has the shape of (l−k+1)/1 which is 382 and 30 kernels.
2. The second layer decreases the number of bits by using max pooling such that the number of bits becomes 191 instead of 382. Thus, the output becomes (191, 30).
3. The next layer is another convolutional layer, for each kernel out of the previous phase the model learns another 30 kernels, the size of each kernel is 3. The total learnable parameters are 3×30×30+30=2730. The output of the third layer has the shape of 189 (same calculation as in step 1) and 30 kernels, thus the output becomes (189,30)
4. Again, max pooling to reduce the total output that makes the output become (94,30).
5. Last convolution layer, this time only 15 kernels. 3×30×15+15=1365. The output of the fifth layer is (92,15). On this output, the tensor is flattened into an output with the form 1380.
6. The next layer is a fully connected layer with 15 neurons. Each of the 1380 features out of the previous layer will be connected to each neuron of the current layer. Thus, the total number of parameters are 1380× 15+15 biases=20715. The output of this layer are the 15 neurons.
7. In the last layer, each of the 15 neurons is connected to the single output neuron. The number of learned parameters is 15×1+1 bias=16. The output of this layer is actually the output of the entire machine learning module. For example, the output is a number between 0 and 1 that represents the probability of the customer joining the financial transaction service.

Example Computer System

Figure 12:
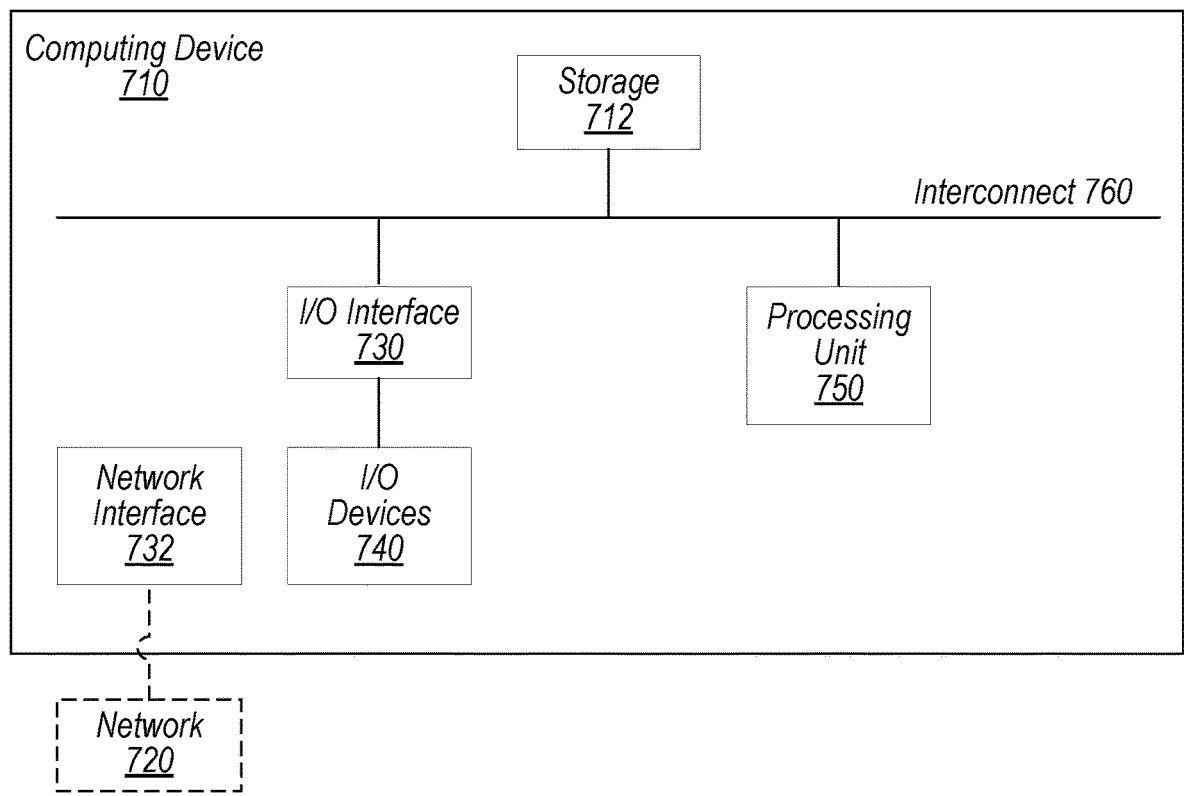
FIG. 12 is a block diagram of one embodiment of a computer system.

Turning now to FIG. 12, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage subsystem 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   accessing, by a computer system, a first data set that includes a first plurality of parameters for an item, wherein the first plurality of parameters corresponds to a plurality of time intervals;
   generating, by the computer system, a two-dimensional graphical representation of the first data set in an image format, wherein a first dimension of the graphical representation is indicative of values of the plurality of parameters at different time intervals, wherein a second dimension of the graphical representation is indicative of a time period that includes the plurality of time intervals, wherein coordinates for the first dimension correspond to identifiers in at least one identifier category for the parameters and coordinates for the second dimension correspond to the time intervals, wherein intersections of the coordinates for the first dimension and the coordinates for the second dimension are represented as pixels in the graphical representation, and wherein a visual appearance of a pixel is determined based on a value of a parameter at an intersecting time interval;
   training an image-based machine learning algorithm by applying a convolutional neural network to the graphical representation of the first data set in the image format;

receiving a second data set that includes a plurality of parameters for the item, wherein the second plurality of parameters corresponds to the plurality of time intervals;

generating a two-dimensional graphical representation of the second data set in the image format; and determining, by the trained image-based machine learning algorithm, at least one characteristic of the second data set based on the graphical representation of the second data set in the image format, wherein the at least one characteristic is determined by the trained image-based machine learning algorithm based on assessment of the visual appearances of the pixels in the graphical representation, wherein at least two hyperparameters for the trained image-based machine learning algorithm correspond to the at least one identifier category and the time intervals.

2. The method of claim 1, wherein the at least one characteristic is a relationship between activity of the values of one or more of the parameters for the item over one or more of the time intervals.

3. The method of claim 1, wherein the at least one characteristic is a probability of an event occurring based on the data set.

4. The method of claim 1, wherein the item is a web interface.

5. The method of claim 4, wherein the parameters include technologies implemented on the web interface, and wherein at least one of the technologies is a user interface technology, a formatting technology, a security technology, an encryption technology, a financial service technology, a scripting language, a coding language, or a web server type.

6. The method of claim 1, wherein the parameters for the item include account parameters for a user account associated with a web-based service.

7. The method of claim 1, wherein the parameters for the item include parameters for a product on a consumer product page.

8. The method of claim 1, wherein the values of the plurality of parameters at different time intervals are binary values or scalar values.

9. The method of claim 1, wherein assessment of the visual appearances of the pixels in the graphical representation corresponds to assessment of changes in the values of the parameters for the item across the time intervals.

10. The method of claim 1, further comprising implementing at least one action corresponding to the item based on the at least one characteristic.

11. A non-transitory computer-readable medium having instructions stored thereon that are executable by a computing device to perform operations, comprising:

accessing a first data set that includes a first plurality of technologies associated with a web interface, wherein the first plurality of technologies corresponds to a plurality of time intervals;

generating a two-dimensional graphical representation of the first data set in an image format, wherein a first dimension of the graphical representation is indicative of values of the plurality of parameters at different time intervals, wherein a second dimension of the graphical representation is indicative of a time period that includes the plurality of time intervals, wherein coordinates for the first dimension correspond to identifiers in at least one identifier category for the parameters and coordinates for the second dimension correspond to the time intervals, wherein intersections of the coordinates for the first dimension and the coordinates for the second dimension are represented as pixels in the graphical representation, and wherein a visual appearance of a pixel is determined based on a value of a parameter at an intersecting time interval;

training an image-based machine learning algorithm by applying a convolutional neural network to the graphical representation of the first data set in the image format;

receiving a second data set that includes a plurality of parameters for the item, wherein the second plurality of parameters corresponds to the plurality of time intervals;

generating a two-dimensional graphical representation of the second data set in the image format; and determining, by the trained image-based machine learning algorithm, at least one characteristic of the second data set based on the graphical representation of the second data set in the image format, wherein the at least one characteristic is determined by the trained image-based machine learning algorithm based on assessment of the visual appearances of the pixels in the graphical representation, wherein at least two hyperparameters for the trained image-based machine learning algorithm correspond to the at least one identifier category and the time intervals.

12. The non-transitory computer-readable medium of claim 11, wherein the at least one probability characteristic includes a probability score for a selected technology being implemented in the web interface.

13. The non-transitory computer-readable medium of claim 11, wherein the at least one probability characteristic is determined based on assessment of changes in a relationship between at least two of the technologies across the time intervals in the graphical representation.

14. The non-transitory computer-readable medium of claim 11, wherein at least one of the plurality of technologies includes a security technology or a financial transaction service.

15. The non-transitory computer-readable medium of claim 11, wherein at least one of the plurality of technologies includes a web-based technology.

16. A method, comprising:

accessing a training data set that indicates values for a plurality of parameters corresponding to one or more classification categories and known labels for one or more subsets of the training data set, wherein the plurality of parameters corresponds to a plurality of time intervals;

representing the training data set using a two-dimensional graphical representation in an image format, wherein a first dimension of the graphical representation is indicative of values of the plurality of parameters at different time intervals, wherein a second dimension of the graphical representation is indicative of a time period that includes the plurality of time intervals, wherein coordinates for the first dimension correspond to identifiers in at least one identifier category for the parameters and coordinates for the second dimension correspond to the time intervals, wherein intersections of the coordinates for the first dimension and the coordinates for the second dimension are represented as pixels in the graphical representation, and wherein a visual appearance of a pixel is determined based on a value of a parameter at an intersecting time interval; and training an image-based machine learning algorithm implementing a convolutional neural network to generate a predictive score indicative of whether an unclassified item corresponds to at least one classification category based on the two-dimensional graphical representation and the known labels, wherein the predictive score is determined by the image-based machine learning algorithm based on assessment of the visual appearances of the pixels the graphical representation, wherein at least two hyperparameters for the trained image-based machine learning algorithm correspond to the at least one identifier category and the time intervals.

17. The method of claim 16, further comprising: generating one or more operating parameters for the image-based machine learning algorithm based on the training; and determining, by the image-based machine learning algorithm operating using the one or more operating parameters, at least one characteristic of a new data set that includes a plurality of parameters for an additional item, wherein the plurality of parameters corresponds to a plurality of time intervals.

18. The method of claim 16, wherein the predictive score is indicative of a probability that the unclassified item corresponds to the at least one classification category.

* * * * *